Figure 1:
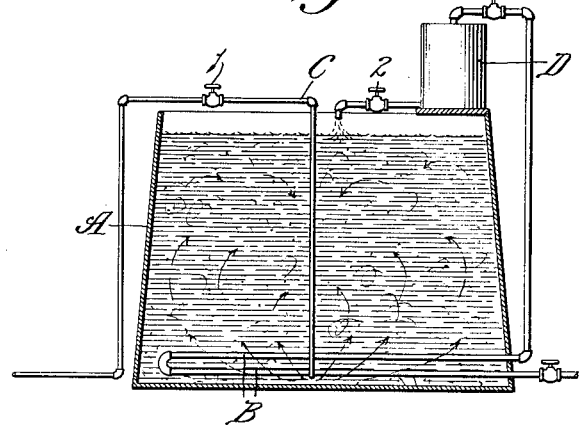

Patented Sept. 11, 1923.

1,467,831

UNITED STATES PATENT OFFICE.

WILLIAM S. BARNICKEL, OF ST. LOUIS, MISSOURI, ASSIGNOR TO WM. S. BARNICKEL & COMPANY, OF ST. LOUIS, MISSOURI, A CORPORATION OF MISSOURI.

PROCESS FOR TREATING PETROLEUM EMULSIONS.

Application filed January 4, 1919. Serial No. 269,575.

*To all whom it may concern:*

Be it known that I, WILLIAM S. BARNICKEL, a citizen of the United States, residing at St. Louis, Missouri, have invented a certain new and useful Improvement in Processes for Treating Petroleum Emulsions, of which the following is a full, clear, and exact description, such as will enable others skilled in the art to which it appertains to make and use the same.

This invention relates to the treatment of petroleum emulsions for the purpose of separating the oil and rendering same fit for commercial use.

Petroleum emulsions contain varying amounts of oil, water or brine and colloidal matter and are of a relatively permanent nature, due to the stabilizing effect of the colloidal matter. Such emulsions are the natural petroleum emulsions produced in oil fields and the emulsions which settle in storage tanks and accumulate in tank farms and oil refineries. They are variously known as "cut oil," "roily oil," "turbid oils," "wet oil," "emulsified oil," "basic sediment," "bottom settlings," "B. S.," "sludge," etc.

In my prior Patent No. 1,093,098, dated April 14, 1914, I have described a process for treating crude oil emulsions of the general character above referred to, which process, briefly stated, consists in intimately mixing a relatively small quantity of a soluble metallic sulfate with a relatively large quantity of the emulsion so as to cause the emulsion to break promptly and yield an upper stratum of clear petroleum, a lower stratum of clear water and an intermediate stratum of slimy substance between the two liquids, the lines of demarcation being clearly defined.

In my prior Patent No. 1,223,659, dated April 24, 1917, I have described a different process for the same purpose that I found to be successful for treating such emulsions, the said process, briefly stated, consisting in introducing a suitable water softening agent into a quantity of the emulsion so as to precipitate or partially precipitate the alkaline earths present in the emulsion and isolate the foreign organic matter, leaving the oil free to separate from the water and foreign matter in the natural way, by gravity.

I have discovered that any substance derived from fatty acids and which retains the fundamental characteristics of the fatty acids has the property of breaking such emulsions more or less effectively. I have also discovered that when a fatty acid is modified by the action upon it of certain substituting chemicals or reagents capable of forming addition or substitution products and the resultant product or its ester or salt, which, for convenience, I will refer to as a "modified fatty acid," is used to treat an emulsion of the character above referred to, the power of the treating agent to break the emulsion is greatly intensified.

The main object of my present invention is to provide a novel and inexpensive process for separating practically all emulsions of the general character previously referred to into their component parts of oil and water or brine. Said process, briefly stated, consists in using a "modified fatty acid," as hereinafter defined, to alter by chemical action the colloidal matter present in such emulsions so as to destroy the stability of the emulsion and cause it to break promptly, yielding an upper stratum of oil and a lower stratum of water or brine which thereafter is drawn off, thus leaving the oil fit for commercial use. One group of substances that I have found to be very efficient for treating such emulsions consists of practically all substitution and addition products of the fatty acids and mixtures of the same. Hence, for the sake of brevity, I have herein used the term "modified fatty acid" to mean a substance, which, in addition to being obtained by the action of a reagent on a fatty acid, also retains the fundamental characteristics of the fatty acids and bears a simple genetic relationship to the fatty acids, the intention being to include by this term all substitution and addition products of the fatty acids and mixtures of same, which possess most of the qualities or distinguishing characteristics of fatty acids, but not to include soaps of the kind mentioned in my U. S. Patent 1,223,659.

Owing to the fact that emulsions of the character to which my process is applicable differ greatly in their composition as to the character of the oil and water contained in the emulsions, the kinds and amount of the salts dissolved therein and the nature and amount of the colloidal matter present in the emulsion, I have found that in some instances one derivative of a fatty acid is more efficient than others in breaking a particular emulsion and in other instances an entirely different derivative or homologue will be found to be more efficient and economical. While any substance derived from fatty acids and which retains the fundamental characteristics of the fatty acids, has the property of breaking such emulsions more or less effectively, the following derivatives of fatty acids are particularly well adapted for breaking these emulsions, namely, the esters, and sulfonates of fatty acids, the sulfo-aromatic compounds of fatty acids, sulfurized fatty acids, the salts and esters of such substances, and mixtures of two or more of the substances above mentioned. The most practical and satisfactory treating agents that I have thus far found, however, are the esters and aromatic compounds of sulfo-fatty acids, the sulfo-fatty acids, and the salts of such substances.

In practicing the process I introduce a relatively small quantity of one of the above-named agents (from .01 per cent to 1 per cent) into a relatively large quantity of the emulsion and allow the mass to stand until the emulsion breaks and separates into an upper stratum of oil and a lower stratum of water or brine. In most instances I intimately mix the chemical agent with the emulsion being treated and in some cases I also apply heat to the mixture until the emulsion breaks and separates. In many instances, however, it is sufficient to merely bring the chemical agent in contact with the emulsion.

Figure 2:
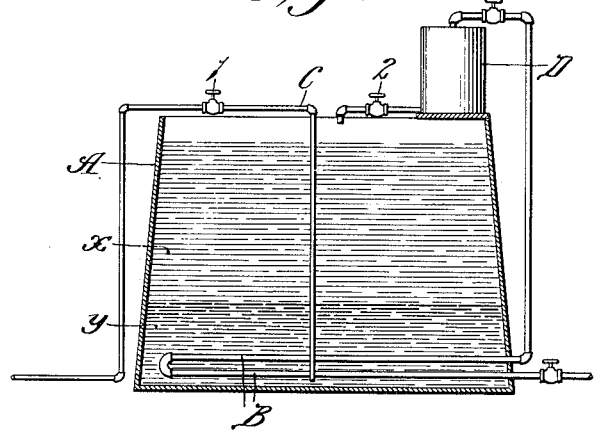

Figure 1 of the drawings is a vertical sectional view of one form of apparatus that can be used in practicing my present process, showing the mass being agitated by air or gas that is introduced into same while the chemical agent is being introduced into the mass; and Figure 2 is a similar view, showing the component parts of the emulsion separated.

The apparatus herein shown, which is only one of many forms of apparatus that can be used in practicing my present process, comprises a tank or container A for holding the petroleum emulsion to be treated, a suitable means for heating said emulsion to the proper temperature, such, for example, as a steam coil B arranged inside of the tank A adjacent the bottom of same, a suitable means for agitating the emulsion in the tank A so as to intimately mix the chemical with the emulsion, such for example, as a pipe C that projects downwardly into the tank A and terminates adjacent the bottom of same and through which air or gas under pressure is introduced into the emulsion, a chemical supply tank D for holding the chamical agent with which the emulsion is treated, a control valve 1 in the pipe C for regulating the supply of gas or air used to agitate the contents of the tank A, and a control valve 2 for regulating the flow of the chemical from the tank D into the emulsion in the tank A.

In practicing my process with an apparatus of the kind herein shown the tank A is first filled with the emulsion to be treated, and thereafter steam is turned into the heating coil B until the desired temperature is obtained. When the proper temperature has been reached, which temperature varies with the character of the emulsion being treated, the valve 1 is opened slowly so as to introduce gas or air under pressure into the lower portion of the tank A until the contents of said tank are in a state of agitation. The valve 2 is then opened so as to permit the chamical agent in the tank D to flow slowly into the contents of the treating tank A and be distributed thoroughly through same. The agitation is continued for from ten to thirty minutes, or until the emulsion breaks, which action is indicated by the formation of large drops of water throughout the mass and in the change in the color of the mixture to the natural color of the oil. The valve 1 is then closed and the mass allowed to stand in a quiescent state, the oil $x$ rising to the top and the water $y$ settling to the bottom of the mass, as shown in Figure 2. The water is then drawn off, leaving the oil ready for marketing, or, if desired, the oil can be drawn off.

The quantity of chemical agent, used depends upon the percentage of colloidal matter or substance in the emulsion. I generally use from fifty to three hundred pounds (from .01 per cent to 1 per cent) of one of the chemical agents previously mentioned, or a combination of said chemical agents, to one thousand barrels of the petroleum emulsion to be treated, sometimes heating the mixture to from 100° F. to 150°, and agitating the mixture thoroughly by means of air or gas under pressure. After the emulsion breaks the water settles out in a few hours, the time varying with the character of the emulsion being treated.

While I have previously stated that the emulsion is subjected to heat during the operation of treating it with the chemical agent, this is not necessary in all instances, particularly when treating oil emulsions freshly produced from the ground, as I have found that mere agitation of the chemical agent with freshly produced emulsion causes the emulsion to break and separate into its component parts, as previously described. I have also found that with some emulsions mere contact of the reagent with the emulsion will cause same to break and separate into its component parts of oil and water or brine.

Having thus described my invention, what I claim and desire to secure by Letters Patent is:

1. In a process for treating petroleum emulsions, the steps of subjecting the emulsion to the action of a modified fatty acid, as herein defined, to cause the emulsion to break and separate into an upper stratum of oil and a lower stratum of water or brine.

2. In a process for treating petroleum emulsions, the step of introducing a relatively small quantity of a modified fatty acid, as herein defined, into a relatively large quantity of the emulsion so as to break the emulsion and cause the particles of oil to collect together.

3. A process for treating petroleum emulsions which consists in introducing into a mass of emulsion a modified fatty acid, as herein defined so as to break the emulsion, heating the mass, allowing the mass to stand until the oil therein separates and rises to the top, and finally drawing off the oil.

4. A process for treating petroleum emulsions, characterized by bringing in contact with a mass of emulsion a modified fatty acid, as herein defined, and allowing the mass to stand until the oil separates and rises to the top.

5. In a process for treating petroleum emulsions, the step of introducing into the emulsion being treated, a relatively small quantity of a sulfo-fatty aromatic acid, to cause the oil in the emulsion to separate and rise to the top of the mass.

6. A process for treating petroleum emulsions which consists in agitating a mass of such an emulsion, heating it and thoroughly distributing through the emulsion a modified fatty acid, as herein defined, to cause the oil in the emulsion to separate and rise to the top of the mass.

7. A process for treating petroleum emulsions which consists in introducing into a mass of such an emulsion a relatively small quantity of a modified fatty acid, as herein defined, thereby causing the emulsion to break, allowing the mass to stand so as to form an upper stratum of oil and a lower stratum of water or brine, and thereafter drawing off the oil.

8. In a process for treating petroleum emulsions, the step of introducing into the emulsion to be treated a relatively small quantity (from .01 per cent to 1 per cent) of a modified fatty acid, as herein defined, so as to cause the emulsion to break and separate into an upper stratum of oil and a lower stratum of water or brine.

9. In the art of treating emulsions of petroleum, the process which comprises thoroughly commingling with the emulsion to be treated a solution containing sulfo fatty acid, using not more than ½ of 1% of the solution relative to the emulsion, thereby freeing the globules of water from the petroleum, and permitting the relatively heavy substances to drop to the bottom of the mass, whereby the oil is separated from the water and impurities.

10. In the art of treating roily oil and bottom settlings, the process which comprises thoroughly commingling a sulfo fatty acid with the oil to be treated, thereby freeing the globules of water from the oil, and then permitting the relatively heavy substances in the oil to drop to the bottom of the mass, whereby the oil is separated from the water and impurities.

WILLIAM S. BARNICKEL.